(No Model.)

W. M. McDOUGALL.
SECONDARY BATTERY.

No. 537,474. Patented Apr. 16, 1895.

WITNESSES:

INVENTOR
William M. McDougall
BY
ATTORNEY

UNITED STATES PATENT OFFICE.

WILLIAM M. McDOUGALL, OF EAST ORANGE, NEW JERSEY.

SECONDARY BATTERY.

SPECIFICATION forming part of Letters Patent No. 537,474, dated April 16, 1895.

Application filed January 7, 1893. Renewed June 15, 1894. Serial No. 514,702. (No model.)

*To all whom it may concern:*

Be it known that I, WILLIAM M. McDOUGALL, a citizen of the United States, residing at East Orange, in the county of Essex and State of New Jersey, have invented certain new and useful Improvements in Secondary Batteries, of which the following is a full, clear, and exact description.

My invention relates to secondary batteries and has special reference to the construction of the electrodes, the object being to produce an electrode from which the active material cannot become detached.

A further object is to provide a battery of long life and of great efficiency.

The invention consists of the details of the construction, which will be hereinafter described and pointed out in the claims.

Figure 1:
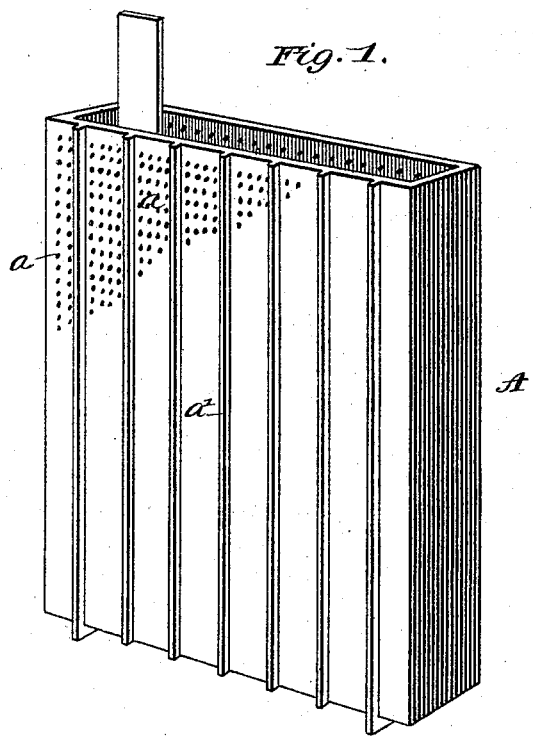
Figure 2:
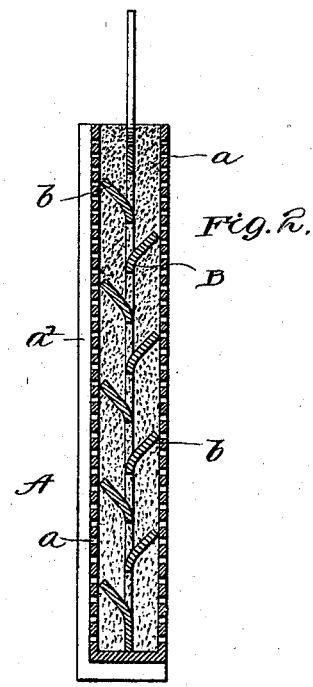
Figure 3:
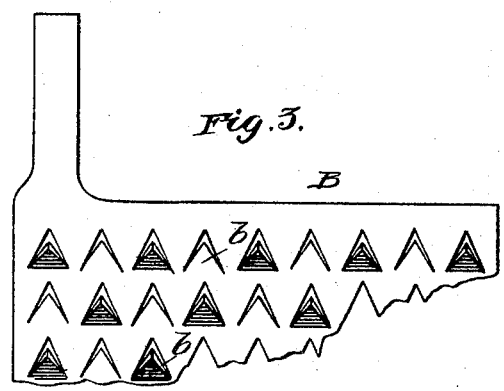

In the accompanying drawings: Figure 1 represents a perspective view of a casing within which the electrode is confined. Fig. 2 is a vertical section of the same, and Fig. 3 is a side elevation of a portion of the plate.

Referring to the drawings by letter, A represents a box of hard rubber, celluloid or any other non-conducting material, preferably one which can be molded. It is open at the top and of sufficient capacity to receive one electrode, as will be described. The side walls of this box are provided with a large number of small perforations, $a$, through which the liquid solution of the cells may pass to act upon the oxide and lead contained within the box. One side of the box is provided with a number of vertical ridges or ribs $a'$, which, when a cell is assembled, rest against a plain wall of the next adjacent box and thereby separate the boxes and permit of a circulation of the liquid in a vertical direction between the boxes. Some of these ribs may also extend across the bottom of the box to form passages for the liquid under it.

If desired, the ribs may be notched or discontinuous to allow of a lateral movement of the liquid.

The electrode proper consists of a plain sheet of lead B, having triangular shaped lugs $b$, in each face, which are formed by making a V-shaped cut and forcing the metal outward. These lugs are bent outward equal distances on each side and preferably to such a distance that their tips will rest against the walls of the box A, when the plate is inserted, and thereby hold the plate in a central position within the box. This is one of the principal features of my invention, for by reason of it the distribution of the active material on the surface of the plate is made and maintained even. The active material is applied to the plate simply by forcing it into the space on each side of the lead sheet. It is forced in until the chambers are full. The lugs $b$, prevent the active material from settling to the lower portions of the box and also serve to make a more intimate connection between the active material and the plate.

I prefer sometimes to make the box A, of several pieces, or of one piece folded up, and when this is done, the quantity of active material used, may be varied by forcing the lugs $b$, outward to a greater or less extent. In assembling the battery, a number of the boxes may be strapped rigidly together, and thus form a stable structure.

Having thus described my invention, I claim—

1. In a storage battery, a perforated box containing an electrode, and provided with vertical spacing ribs on the exterior of one wall for the purpose set forth.

2. In a storage battery, a perforated box containing an electrode and provided with vertical spacing ribs on the exterior of one wall and ribs across the bottom for the purpose set forth.

3. In a storage battery, a perforated box or envelope of non-conducting material, in combination with a flat electrode located inside the same and provided throughout both its surfaces with a plurality of laterally projecting lugs bearing against the inside walls of the box or envelope for the purpose of maintaining it in a central position therein.

4. In a storage battery, a perforated box containing an electrode provided throughout both its surfaces with a plurality of laterally projecting lugs bearing against the inside walls of the box, for the purpose of maintaining the electrode in a central position therein, and active material filling the space on each side of the electrode, substantially as described.

In testimony whereof I subscribe my signature in presence of two witnesses.

WILLIAM M. McDOUGALL.

Witnesses:
WM. A. ROSENBAUM,
FRANK S. OBER.